(12) United States Patent
Heninwolf (10) Patent No.: US 8,769,030 B2
(45) Date of Patent: Jul. 1, 2014

(54) DEVICE EVENT NOTIFICATION REGISTRATION THROUGH DIRECT INTERACTION WITH MOBILE DEVICE

(71) Applicant: Google Inc., Mountain View, CA (US)

(72) Inventor: Paul Heninwolf, San Carlos, CA (US)

(73) Assignee: Google Inc., Mountain View, CA (US)

( * ) Notice: Subject to any disclaimer, the term of this patent is extended or adjusted under 35 U.S.C. 154(b) by 2 days.

(21) Appl. No.: 13/630,065

(22) Filed: Sep. 28, 2012

(65) Prior Publication Data

US 2014/0091923 A1    Apr. 3, 2014

(51) Int. Cl.
| | | |
|---|---|---|
| G06F 15/16 | (2006.01) | |
| H04L 12/58 | (2006.01) | |
| H04L 12/26 | (2006.01) | |
| H04L 12/28 | (2006.01) | |
| G05B 15/02 | (2006.01) | |

(52) U.S. Cl.
CPC .............. *H04L 51/32* (2013.01); *H04L 12/2803* (2013.01); *H04L 43/04* (2013.01); *G05B 15/02* (2013.01); *H04L 51/24* (2013.01)
USPC ............. 709/206; 709/219; 709/224; 700/19; 370/254

(58) Field of Classification Search
CPC ......... H04L 51/32; H04L 51/24; H04L 43/04; H04L 12/2803; G05B 15/02
USPC ............. 709/224, 219, 206; 715/772; 700/19, 700/278; 370/310, 254
See application file for complete search history.

(56) References Cited

U.S. PATENT DOCUMENTS

| | | | |
|---|---|---|---|
| 7,647,394 B2 | 1/2010 | Rao et al. | |
| 8,340,826 B2 * | 12/2012 | Steinberg | 700/278 |
| 2002/0147660 A1 | 10/2002 | Indence | |
| 2003/0065407 A1 * | 4/2003 | Johnson et al. | 700/19 |
| 2003/0189509 A1 | 10/2003 | Hayes et al. | |
| 2005/0159823 A1 * | 7/2005 | Hayes et al. | 700/19 |

(Continued)

FOREIGN PATENT DOCUMENTS

WO    2010024986    3/2010

OTHER PUBLICATIONS

International Search Report and Written Opinion for PCT/US2013/061339, dated Nov. 27, 2013.

(Continued)

*Primary Examiner* — Jungwon Chang
(74) *Attorney, Agent, or Firm* — Morris & Kamlay LLP (57) ABSTRACT

A method for registering for an appliance event notification comprises scanning a machine-readable code by a device and sending a request to register for an event notification to an appliance. A user interface corresponding to the appliance is displayed and the user interface includes an identification of at least one appliance specific event. A selection of an appliance specific event is received and a request to register for an event notification corresponding to the selected appliance specific event is sent to the appliance. An event notification is received upon occurrence of the event at the appliance. Additionally, the user interface includes an identification of at least one appliance specific control function. A request to register for control of the appliance corresponding to a selected appliance specific control function is sent to the appliance. Accordingly, instructions for control of the appliance are sent from the mobile device.

27 Claims, 5 Drawing Sheets

(56) References Cited

U.S. PATENT DOCUMENTS

| | | | |
|---|---|---|---|
| 2008/0137572 A1* | 6/2008 | Park et al. | 370/310 |
| 2008/0209034 A1* | 8/2008 | Shin et al. | 709/224 |
| 2008/0282182 A1* | 11/2008 | Oosaka | 715/772 |
| 2009/0150789 A1 | 6/2009 | Regnier | |
| 2011/0213472 A1 | 9/2011 | Clayton et al. | |
| 2013/0073690 A1* | 3/2013 | DeSalvo et al. | 709/219 |

OTHER PUBLICATIONS

Chen, Jiann-Liang et al., "Digital Home Networking and Services with OSGi Platform", International Conference on New Trends in Information and Service Science, 2009. NISS '09, IEEE, Piscataway, NJ, USA, Jun. 30, 2009, pp. 372-377.

* cited by examiner

DEVICE EVENT NOTIFICATION REGISTRATION THROUGH DIRECT INTERACTION WITH MOBILE DEVICE

BACKGROUND

There are various devices and appliances for which it may be useful to control operation of the device when a user is not present, e.g., by using a mobile device. Home automation systems may provide the user with the option to receive an event notification such as "dryer cycle has completed" or "front door opened." Such notifications are useful but can be difficult to configure due to the variety of devices that may generate such a notification (e.g., front door, dryer, washer, etc.), variety of events that could trigger a notification, variety of destinations to send the notifications (e.g., which user or which user's device), means of notifying (e.g., text message, email, pop-up alert, etc.). Accordingly, a simple way for the user to request the notification type, source, and destination may be helpful.

BRIEF SUMMARY

According to an implementation of the disclosed subject matter, a method for registering for a device event notification comprises scanning a machine-readable code by a destination device and sending a request to register for an event notification to an event generating device. A user interface corresponding to the event generating device may be displayed at the destination device and the user interface may include at least a first and a second control function to control the event generating device. The first control function may control an on/off status of the event generating device and the second control function may control a function other than the on/off status of the event generating device. A request to register for an event notification corresponding to the second control function may be received at the event generating device. Additionally, an event notification may be sent to the destination device upon occurrence of the event at the event generating device.

According to an implementation of the disclosed subject matter, a method for registering for an appliance event notification may comprise scanning a machine-readable code by a mobile device and sending a request to register for an event notification to an appliance. A user interface corresponding to the appliance may be displayed at the mobile device and the user interface may include an identification of at least one appliance specific event. A selection of a first appliance specific event may be received and a request to register for an event notification corresponding to the selected appliance specific event may be sent from the mobile device to the appliance. Additionally, the event notification may be received upon occurrence of the event at the appliance.

According to an implementation of the disclosed subject matter, a method for registering for control of an appliance may comprise scanning a machine-readable code by a mobile device and sending a request to register for control of an appliance. A user interface corresponding to the appliance may be displayed at the mobile device and the user interface may include an identification of at least one appliance specific control function. A selection of a first appliance specific control function may be received. A request to register for control of the appliance corresponding to the selected appliance specific control function may be sent to the appliance from the mobile device.

According to an implementation of the disclosed subject matter, a system may comprise a computer-readable medium which stores event notification registration information. The event notification registration information may correspond to at least one appliance specific event. Additionally, a processor may be configured to send a request to register for an event notification and provide a user interface corresponding to an appliance. The user interface may include an identification of at least one appliance specific event. A selection of a first appliance specific event may be received. Further, the event notification may be received upon occurrence of the event at the appliance.

According to an implementation of the disclosed subject matter, a system may comprise a computer-readable medium which stores registration information for control of an appliance. The registration information may correspond to at least one appliance specific control function. Additionally, a processor may be configured to send a request to register for an appliance control function and provide a user interface corresponding to an appliance. The user interface may include an identification of at least one appliance specific control function. A selection of a first appliance specific control function may be received. Further, instructions for control of the appliance corresponding to the selected appliance specific control function may be sent.

Additional features, advantages, and implementations of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The present disclosure proposes systems and methods to register for a device event notification through direct interaction with a mobile device. A direct interaction may be between a destination device (e.g., a mobile device) and an event-generating device (e.g., an appliance) and may include a machine-readable code, such as a barcode, near-field communications tag, etc. For example, a barcode may include a linear 1-dimensional or 2-dimensional barcode such as a UPC, QR code or data matrix which may be visible on the event-generating device and may be scanned by a destination device, such as a smart phone, tablet computer, or other mobile device, using a camera or similar barcode reader. A near-field communications tag may include, for example, an NFC tag, an RFID tag, another radio technology capable of recognizing very near device communications, etc., which may be embedded in the event-generating device and may be scanned by the destination device with an appropriate reader component.

The initial message or subsequent message(s) from the mobile device to the event-generating device may indicate a request to register for an event and may specify the type of event for which to register. Additionally, the initial message or subsequent message(s) could indicate a different request.

A request for registration from a mobile device to an event-generating device may automatically register the mobile device for a default event from the event-generating device or present a variety of event types from among which the user may make a selection.

The barcode or near-field communications tag may include sufficient information for a mobile device to send an initial message to the event-generating device. The initial message typically contains sufficient information for the event-generating device to reply in response to the mobile device.

For example, a user may wish to register for a device event notification corresponding to an event-generating device. The user may use a mobile device to scan a machine-readable code, for example, a QR code, associated with an event-generating device, for example, a dishwasher. The QR code may include sufficient information for the mobile device to send an initial message to the event-generating device. The initial message from the mobile device to the event-generating device may indicate a request to register for an event notification, for example, when the dishwasher's drying cycle has completed. The initial message may be received by the event-generating device, and may contain sufficient information for the event-generating device to reply in response to the request to register from the mobile device. Accordingly, the dishwasher may reply to the request from the mobile device by subsequently providing notifications to the mobile device notifying the user when the drying cycle has completed.

In addition, the dishwasher may reply to the request to register from the mobile device with a variety of event types from among which the user may choose to register for notification(s). For example, the user may choose to register for notifications when the dishwasher's drying cycle is complete, when the dishwasher has started a wash cycle, when the dishwasher is running low on rinse-aid, etc.

Figure 1:
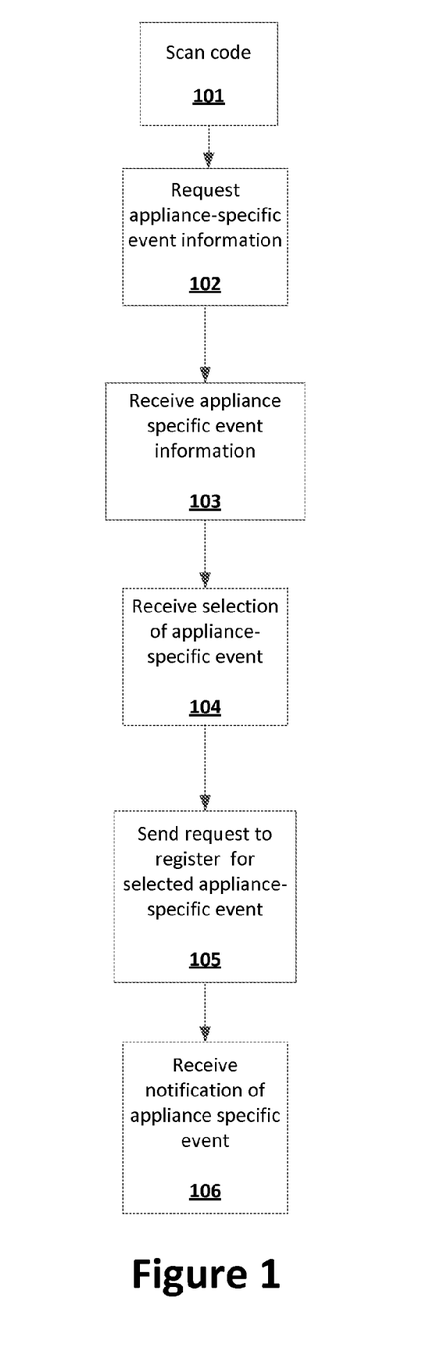
FIG. 1 shows an example process according to an implementation of the disclosed subject matter.

Implementations of the disclosed subject matter may include techniques for registering for an appliance event notification by scanning a machine-readable code by a mobile device. FIG. 1 shows an example of such a registration process. As shown, upon scanning a machine-readable code at 101, a request to register for an event notification may be sent to an appliance at 102. At 103, a user interface corresponding to the appliance may be displayed at the mobile device and may include an identification of at least one appliance specific event. The user interface may be based upon information received from the appliance, information stored within, or otherwise obtained by, the mobile device, or the like. The mobile device may receive a selection of a first appliance specific event from among the displayed appliance specific event(s), at step 104. For example, a user may select an appliance specific event from among events displayed in the user interface at the mobile device. The mobile device may send to the appliance a request to register for an event notification corresponding to the selected appliance specific event at 105. Accordingly, at 106 the mobile device may receive the event notification upon occurrence of the event at the appliance 106. For example, upon occurrence of the event, a processor in the appliance or a computer system to which the appliance is connected, such as a home automation system, may send an event notification to a device that has registered to receive it.

Figure 2:
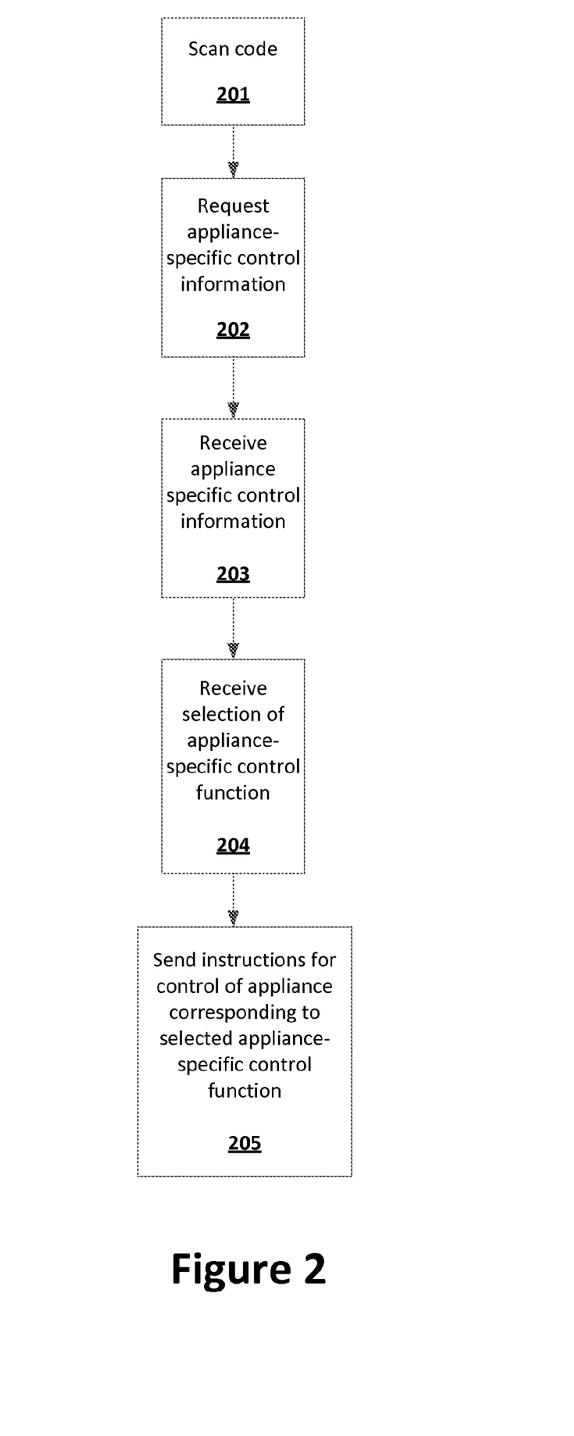
FIG. 2 shows an example process according to an implementation of the disclosed subject matter.

FIG. 2 shows an implementation of the disclosed subject matter in which a mobile device sends a request to register for control of an appliance. The example process shown in FIG. 2 may be implemented, for example, subsequent to the mobile device registering to receive an event notification as described with respect to FIG. 1, or it may be implemented separately. Upon scanning the machine-readable code at 201, a request to register for control of an appliance may be sent at 202. The request may be sent, for example, to the appliance to be controlled, to an associated computer system such as a home automation system, or the like. A user interface corresponding to the appliance may be displayed at the mobile device, and the user interface may include an identification of at least one appliance specific control function at 203. The user interface may be based upon information received from the appliance, information stored within, or otherwise obtained by, the mobile device, or the like. At least one appliance specific control function may be selected from among the displayed appliance specific control function(s), at step 204. The mobile device may send instructions for control of the appliance corresponding to the selected appliance specific control function(s) at 205. For example, the mobile device or a computer system in communication with the mobile device, such as a home automation system, may send instructions to the appliance for control of appliance functions.

Figure 3:
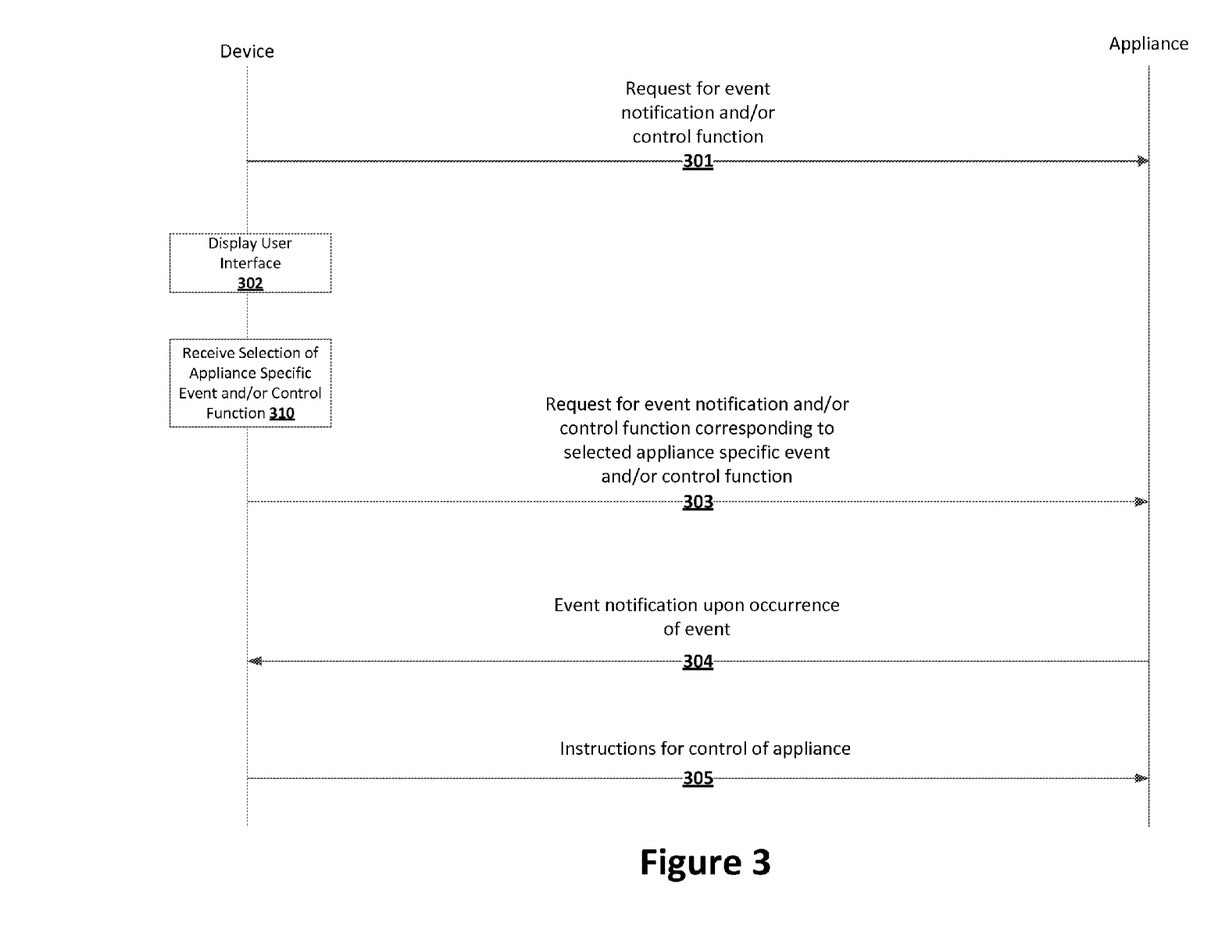
FIG. 3 shows an example information flow according to an implementation of the disclosed subject matter.

FIG. 3 shows an example data exchange according to an implementation of the disclosed subject matter. As previously described, registering for an appliance event notification and/or control of the appliance may include scanning a machine-readable code by a mobile device. Upon scanning the machine-readable code, the mobile device may send a request to register for an event notification to an appliance, at 301. A user interface corresponding to the appliance may be displayed at the mobile device, at 302. The user interface may include, for example, a first and a second control function to control the appliance. As a specific example, the first control function may control an on/off power status of the appliance and the second control function may control a function other than the on/off power status of the appliance, such as a dishwasher, washing machine, dryer, refrigerator, oven, microwave, television, and the like. A user may then select an appliance specific event and/or control function, such as control of the dryer cycle on a dryer, at 310. The request to register for an event notification corresponding to the second control function may then be sent at 303 from the device to the appliance. As previously described, the appliance may send an event notification to the mobile device upon occurrence of the event at the appliance, at 304. Additionally, the event notification may enable the second control function. Further, the mobile device may send instructions for controlling the appliance, at 305.

Figure 4:
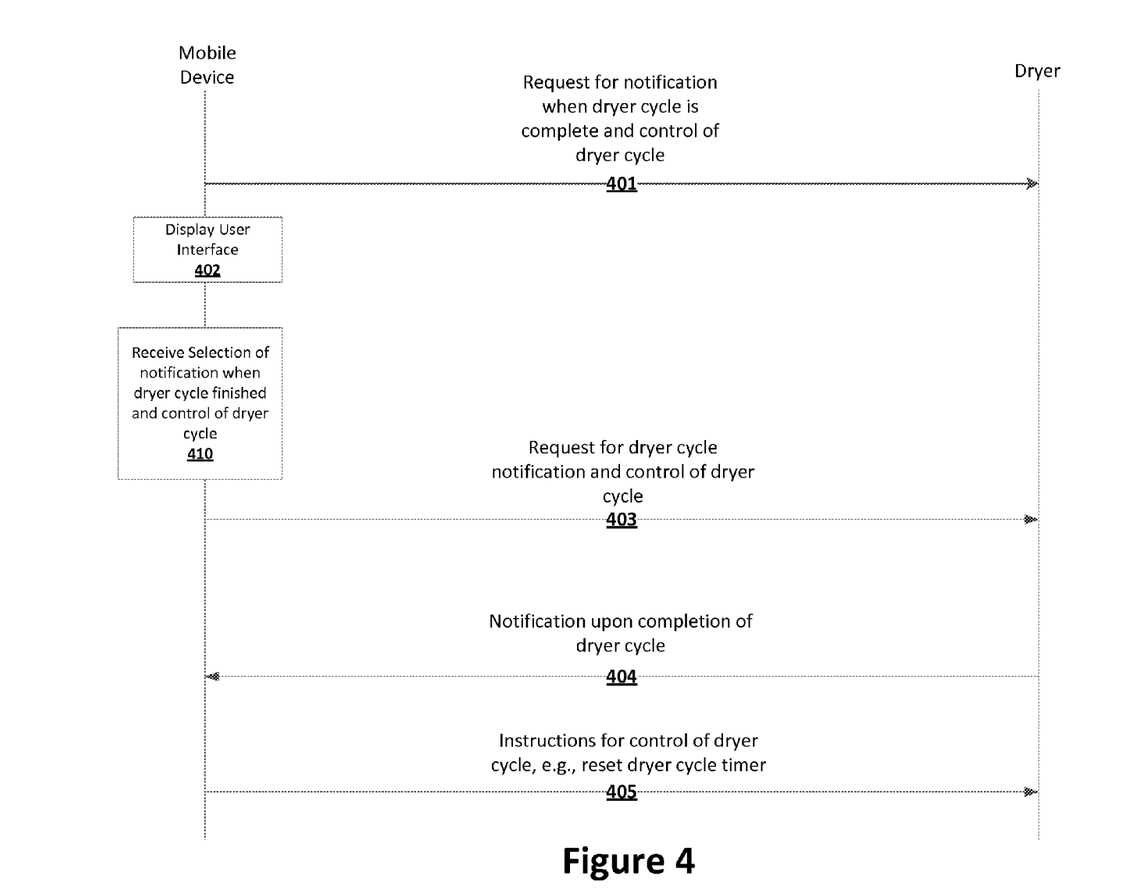
FIG. 4 shows an example information flow according to an implementation of the disclosed subject matter.

FIG. 4 shows an example data exchange according to an implementation of the disclosed subject matter. As described above, a user may wish to register for a device event notification, for example when the dryer cycle has completed on a dryer. The user may use a mobile device to scan a machine-readable code, for example, a QR code, associated with an event-generating device, for example, a dryer. Upon scanning the QR code, the mobile device may send to the dryer, a request to register for notification when the dryer cycle completes and for control of the dryer cycle. A user interface corresponding to the dryer may be displayed on the mobile device, at 402. The user interface may include control functions associated with the dryer, such as, a power on/off control and a dryer time/cycle control, at 410. Once the user has selected the power on/off and dryer time/cycle control functions, the dryer may receive the request to register for an event notification corresponding to the dryer time/cycle control function, at 403. Accordingly, the dryer may send a notification to the user's mobile device when a dryer cycle is complete, at 404, and enable the user to control the dryer by switching the power on/off or restarting/selecting the dryer cycle/timer, at 405. Additionally, the user may be able to turn the dryer on and off.

In an implementation of the disclosed subject matter, a system may comprise a computer-readable medium which stores event notification registration information. The event notification registration information may correspond to at least one appliance specific event. Additionally, a processor may be configured to send a request to register for an event notification and provide a user interface corresponding to an appliance. The user interface may include an identification of at least one appliance specific event. A selection of a first appliance specific event may be received. Further, the event notification may be received upon occurrence of the event at the appliance.

An implementation according to the disclosed subject matter includes a system which comprises a computer-readable medium which stores registration information for control of an appliance. The registration information may correspond to at least one appliance specific control function. Additionally, a processor may be configured to send a request to register for an appliance control function and provide a user interface corresponding to an appliance. The user interface may include an identification of at least one appliance specific control function. A selection of a first appliance specific control function may be received. Further, instructions for control of the appliance corresponding to the selected appliance specific control function may be sent.

Additionally, a request for registration from a mobile device to an event-generating device may automatically register the mobile device for at least one default control function and/or at least one default event notification corresponding to the appliance. In addition, a user interface may present a variety of control functions and/or event notifications, corresponding to the appliance, from among which the user may make a selection.

In an implementation, the communication between the mobile device and the event-generating device may be across one or more bridges between the interfaces. For example, the communications between the mobile device and the event-generating device may be managed or assisted by a third device, such as, a coordinating device, a local coordinator, a remote server, etc. In such cases, the third device may, for example, determine addressing information for the event-generating device, based on the scanned information, and supply that information to the mobile device. Alternatively, the third device may route the request for registration through to the event-generating device, based on the scanned info. This may enable the scanned machine-readable code to include static information that is insufficient to determine how to reach the event-generating device destination, but which may be used by a third device to complete the connection.

The machine-readable code may be a code which is in a format that can be understood by a computer and/or a code capable of storing data in a format readable by a mechanical device or corresponding code reader. Examples of machine-readable code as used herein include quick response code, data matrix code, barcode, near-field communications tag, radio-frequency identification tag, or any similar or otherwise suitable computer-readable code that can be automatically read and acted upon by a device.

Examples of an event notification may include a text message, an email, a portable application notification, a proprietary application alert, a recorded message, a visual indicator, an audio indicator, or any similar or otherwise suitable notification type that can be sent to a device.

Examples of a mobile device may include a smartphone, PDA, handheld device, handheld computer, tablet, a mobile phone, or any similar or otherwise suitable device that can scan a machine-readable code and receive notifications.

Figure 5:
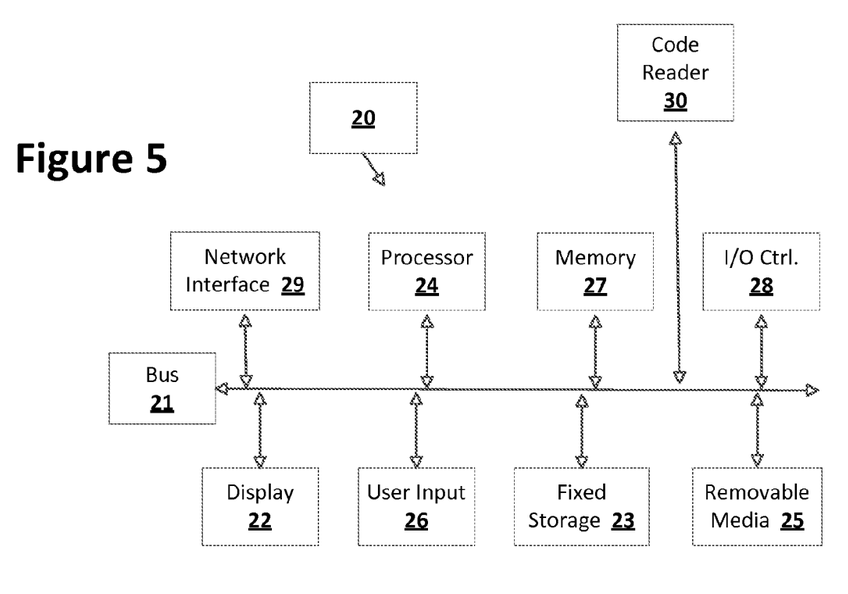
FIG. 5 shows a computer according to an implementation of the disclosed subject matter.

Implementations of the presently disclosed subject matter may be implemented in and used with a variety of component and network architectures. FIG. 5 is an example computer 20 suitable for implementing implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a code reader 30, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 5 need not be present to practice the present disclosure. The components can be interconnected in different ways from that shown. The operation of a computer such as that shown in FIG. 5 is readily known in the art and is not discussed in detail in this application. Code to implement the present disclosure can be stored in computer-readable storage media such as one or more of the memory 27, fixed storage 23, removable media 25, or on a remote storage location.

Figure 6:
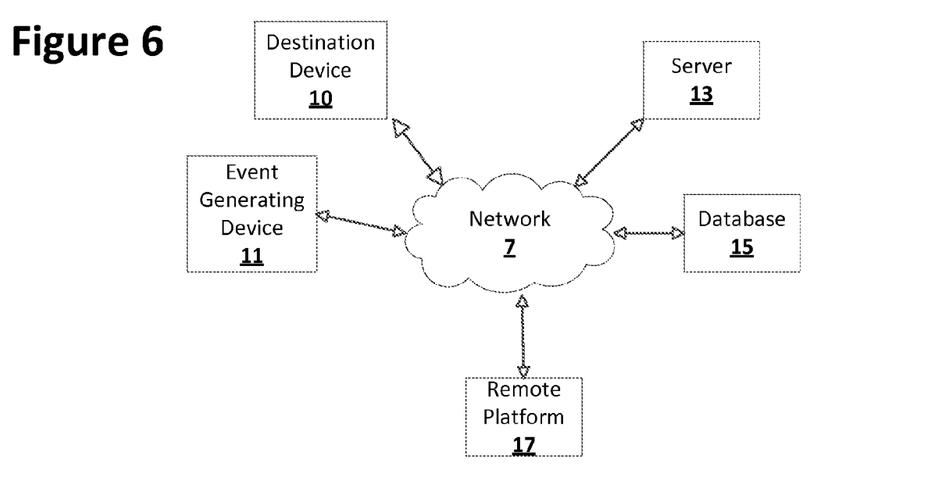
FIG. 6 shows a network configuration according to an implementation of the disclosed subject matter.

FIG. 6 shows an example network arrangement according to an implementation of the disclosed subject matter. One or more clients such as destination device 10, such as local computers, smart phones, tablet computing devices, and the like, and event generating device 11, such as an appliance, may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be embodied in the form of computer-implemented processes and apparatuses for practicing those processes. Implementations also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that embodies all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

What is claimed is:

1. A method for registering for a device event notification, comprising:
scanning a machine-readable code identifying an event generating device by a mobile device,
in response to scanning the machine-readable code, sending, by the mobile device, a request to register for an event notification to the event generating device,
displaying at a first destination device a user interface corresponding to the event generating device, wherein the user interface includes at least a first and a second control function to control the event generating device, wherein the first control function controls an on/off status of the event generating device and the second control function controls a function other than the on/off status of the event generating device,
receiving the request to register for an event notification corresponding to the second control function, and
sending an event notification upon occurrence of the event at the event generating device.

2. The method of claim 1, wherein the event notification is sent to a second destination device.

3. The method of claim 2, wherein the mobile device and the second destination device are the same.

4. The method of claim 1, wherein the request to register for an event notification is sent by a coordinating device distinct from the mobile device.

5. The method of claim 1, wherein the request to register for an event notification corresponding to the second control function is received at the event generating device.

6. The method of claim 1, wherein the request to register for an event notification corresponding to the second control function is received at a coordinating device.

7. The method of claim 1, wherein the event notification enables the second control function.

8. A method for registering for an appliance event notification, comprising:
scanning a machine-readable code identifying an appliance by a mobile device,
in response to scanning the machine-readable code, sending, by the mobile device, a request to register for an event notification to the appliance,
displaying at the mobile device a user interface corresponding to the appliance, wherein the user interface includes an identification of at least one appliance specific event,
receiving a selection of a first appliance specific event of the at least one appliance specific event,
sending to the appliance a request to register for an event notification corresponding to the at least one selected appliance specific event from the mobile device,
receiving the event notification upon occurrence of the event at the appliance.

9. The method of claim 1, wherein the mobile device and the first destination device are the same.

10. The method of claim 8, wherein the machine-readable code is selected from the group consisting of quick response code, data matrix code, barcode, near-field communications tag, and radio-frequency identification tag.

11. The method of claim 8, wherein the machine-readable code comprises radio technology capable of recognizing very near device communications.

12. The method of claim 8, wherein the event notification is selected from the group consisting of a text message, an email, a portable application notification, a proprietary application alert, a recorded message, a visual indicator, and an audio indicator.

13. The method of claim 8, further comprising:
sending a request to register for control of an appliance,
displaying at the mobile device a user interface corresponding to the appliance, wherein the user interface includes an identification of at least one appliance specific control function,
receiving a selection of a first appliance specific control function of the at least one appliance specific control function,
sending to the appliance a request to register for control of an appliance corresponding to the at least one selected appliance specific control function from the mobile device.

14. The method of claim 8, further comprising:
displaying at the mobile device a user interface corresponding to the appliance, wherein the user interface includes an identification of a second appliance specific event,
receiving a selection of the second appliance specific event,
sending to the appliance a request to register for a second event notification corresponding to the second selected appliance specific event from the mobile device,
receiving the second event notification upon occurrence of the second event at the appliance.

15. A method for registering for control of an appliance, comprising:
scanning a machine-readable code identifying an appliance by a mobile device,
in response to scanning the machine-readable code, sending, by the mobile device, a request to register for control of the appliance,
displaying at the mobile device a user interface corresponding to the appliance, wherein the user interface includes an identification of at least one appliance specific control function,
receiving a selection of a first appliance specific control function of the at least one appliance specific control function,
sending to the appliance instructions for control of the appliance corresponding to the at least one selected appliance specific control function from the mobile device.

16. The method of claim 15, wherein the machine-readable code is selected from the group consisting of quick response code, data matrix code, barcode, near-field communications tag, and radio-frequency identification tag.

17. The method of claim 15, wherein the machine-readable code comprises radio technology capable of recognizing very near device communications.

18. The method of claim 15, further comprising:
sending a request to register for an event notification to an appliance,
displaying at the mobile device a user interface corresponding to the appliance, wherein the user interface includes an identification of at least one appliance specific event,
receiving a selection of a first appliance specific event of the at least one appliance specific event,
sending to the appliance a request to register for an event notification corresponding to the at least one selected appliance specific event from the mobile device.

19. The method of claim 15, further comprising:
displaying at the mobile device a user interface corresponding to the appliance, wherein the user interface includes an identification of a second appliance specific control function,
receiving a selection of the second appliance specific control function,
sending to the appliance a request to register for control of the appliance corresponding to the second selected appliance specific control function from the mobile device.

20. The method of claim 15, wherein the mobile device is at least one selected from the group consisting of a smartphone, PDA, handheld device, handheld computer, tablet, and a mobile phone.

21. A system, comprising:
a computer-readable device storing event notification registration information, wherein the event notification registration information corresponds to at least one appliance specific event;
a processor configured to:
scan a machine-readable code identifying an event generating device by a mobile device,
in response to scanning the machine-readable code, send, by a mobile device, a request to register for an event notification to an appliance,
provide a user interface corresponding to the appliance, wherein the user interface includes an identification of at least one appliance specific event,
receive a selection of a first appliance specific event of the at least one appliance specific event,
receive the event notification upon occurrence of the event at the appliance.

22. The system of claim 21, wherein the event notification is at least one selected from the group consisting of a text message, an email, a portable application notification, a proprietary application alert, a recorded message, a visual indicator, and an audio indicator.

23. The system of claim 21, wherein the processor is configured to send a request to register for an event notification subsequent to a machine-readable code associated with the appliance being scanned, and wherein the machine-readable code is selected from the group consisting of quick response code, data matrix code, barcode, near-field communications tag, and radio-frequency identification tag.

24. The system of claim 23, wherein the machine-readable code comprises radio technology capable of recognizing very near device communications.

25. The system of claim 21, wherein the processor is further configured to:
send a request to register for control of the appliance,
provide a user interface corresponding to the appliance, wherein the user interface includes an identification of at least one appliance specific control function,
receive a selection of a first appliance specific control function of the at least one appliance specific control function, and
send a request to register for control of the appliance corresponding to the at least one selected appliance specific control function.

26. The system of claim 21, wherein the user interface includes an identification of a second appliance specific event, and wherein the processor is further configured to:
receive a selection of the second appliance specific event, send a request to register for a second event notification corresponding to the second selected appliance specific event, receive the second event notification upon occurrence of the second event at the appliance.

27. The system of claim 21, further comprising a scanner configured to scan a machine-readable code associated with the appliance.

* * * * *